United States Patent [19]
Buck

[11] 3,890,481
[45] June 17, 1975

[54] ELECTROEROSIVE PROCESS FOR MANUFACTURING ROTARY DIES

[76] Inventor: Homer G. Buck, 803 S. Rimpau Ave., Los Angeles, Calif. 90005

[22] Filed: Feb. 22, 1972

[21] Appl. No.: 228,205

Related U.S. Application Data

[60] Continuation of Ser. No. 16,620, Oct. 10, 1969, which is a division of Ser. No. 712,247, March 11, 1968, Pat. No. 3,542,993.

[52] U.S. Cl. ........ 219/69 M; 204/143 M; 219/69 V
[51] Int. Cl. ........................... B23p 1/08; B23p 1/04
[58] Field of Search .... 219/69 M, 69 V; 204/143 M

[56] References Cited
FOREIGN PATENTS OR APPLICATIONS
1,472,130  1/1967  France .............................. 219/69 V Primary Examiner—R. F. Staubly
Attorney, Agent, or Firm—Fulwider, Patton, Rieber, Lee & Utecht

[57] ABSTRACT

The manufacture of rotary dies, in electrical discharge machining, by the rolling of a cylindrical workpiece, over fixed ways, in spaced relationship to the surface of a preformed, flat matrix electrode having a flat development of the die pattern to be imparted to the cylindrical surface of the die.

10 Claims, 20 Drawing Figures

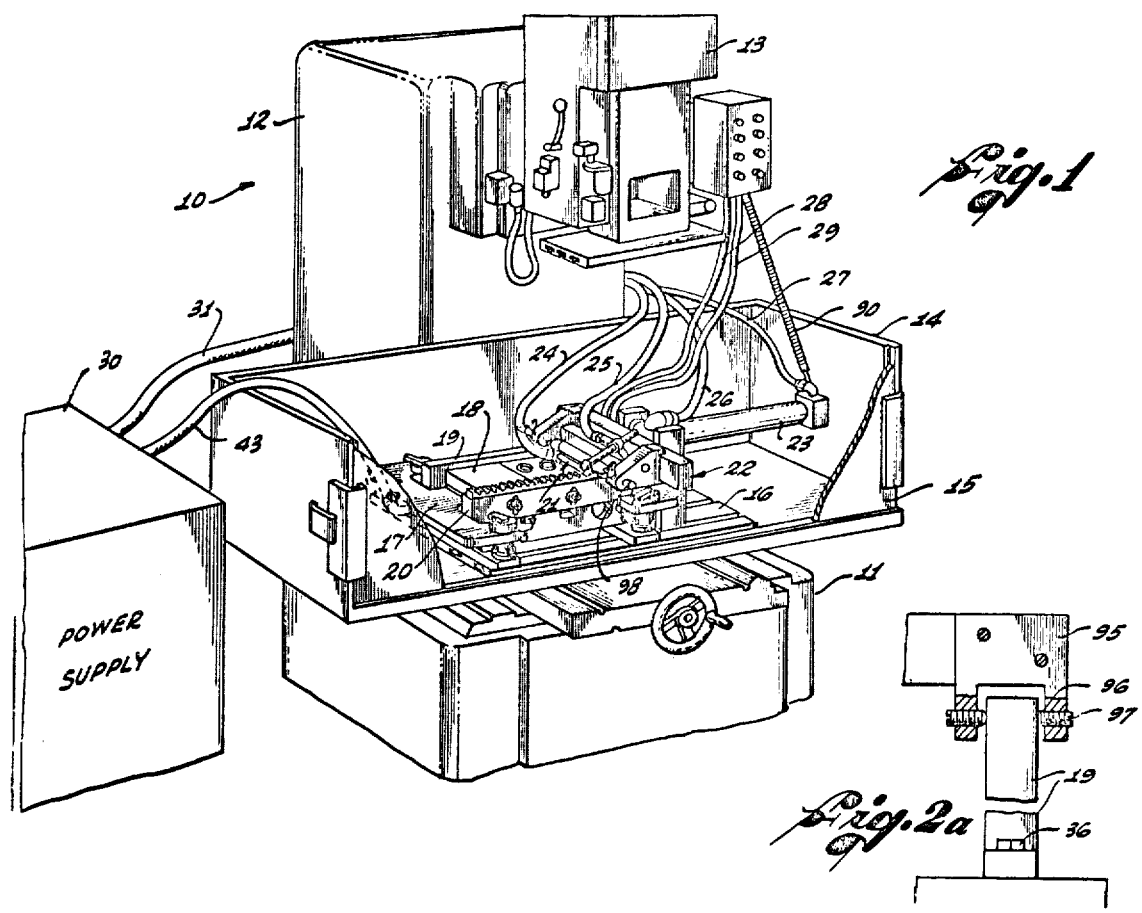
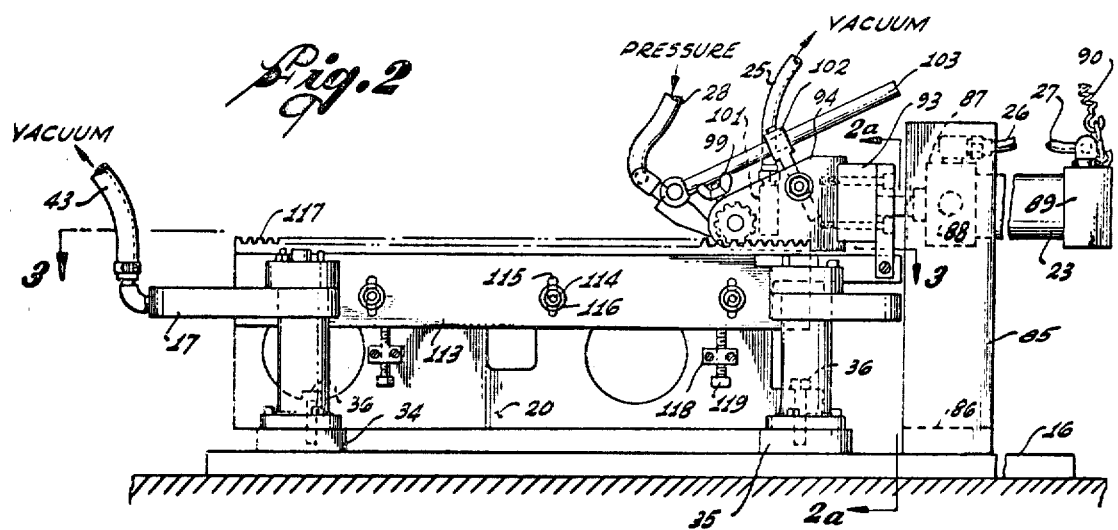

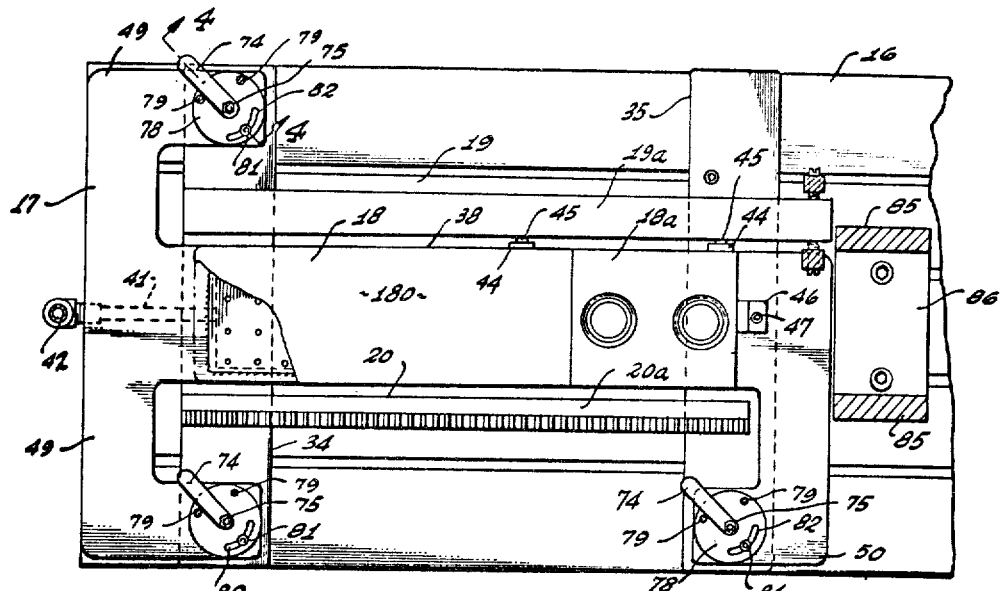
Fig. 3
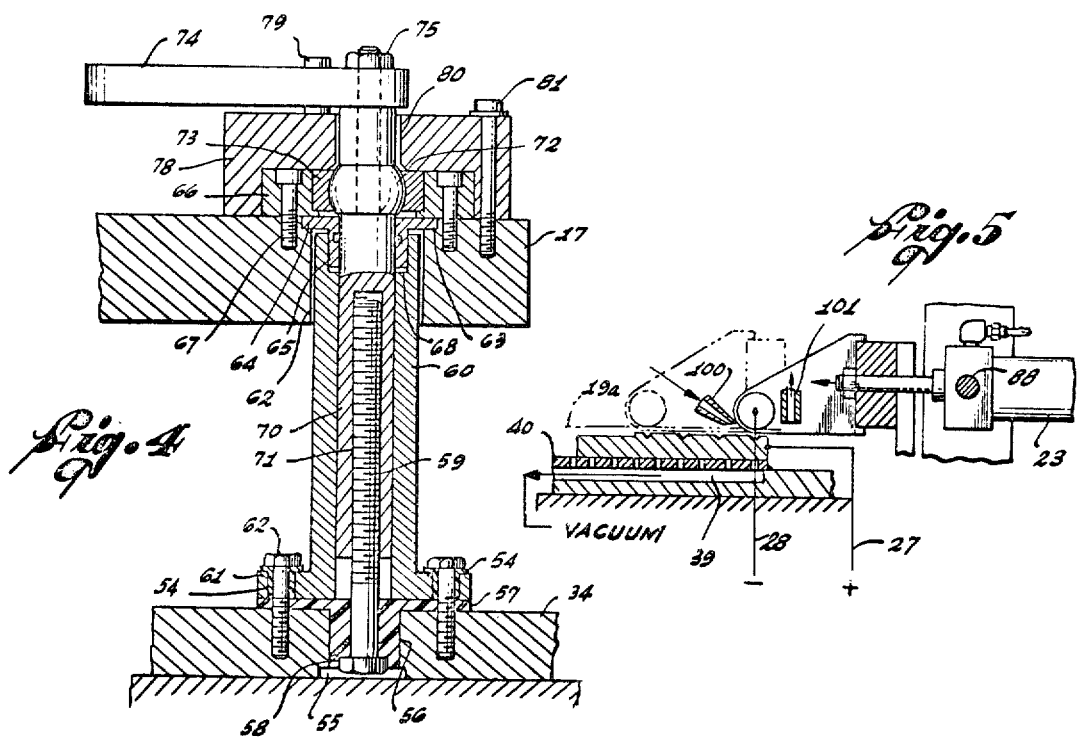
Fig. 4
Fig. 5

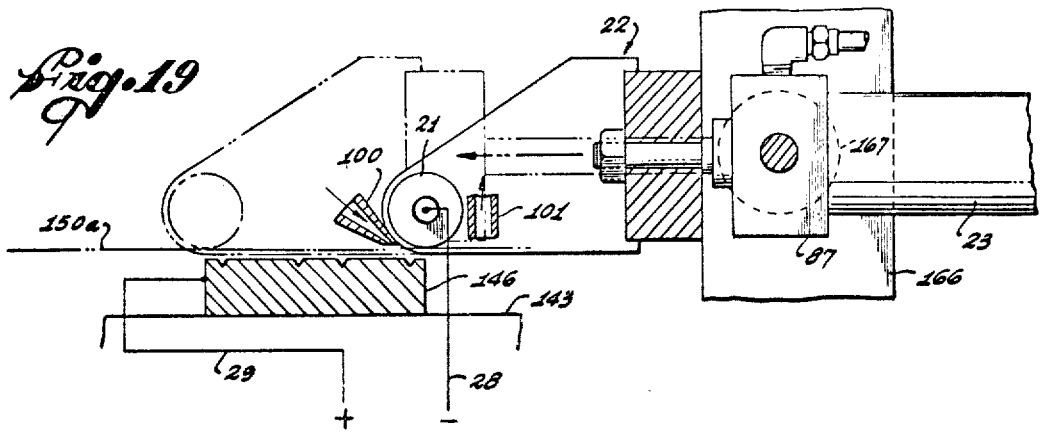
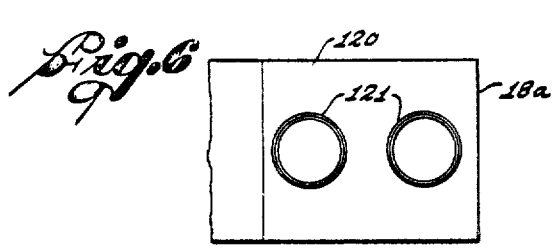
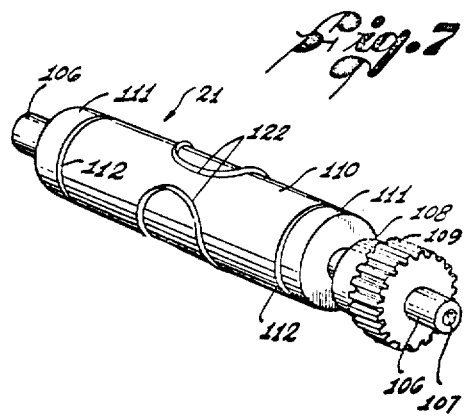
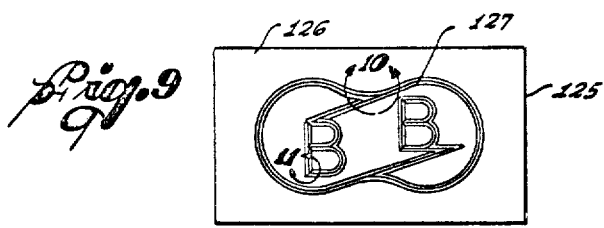
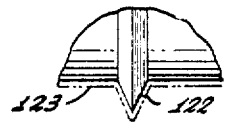
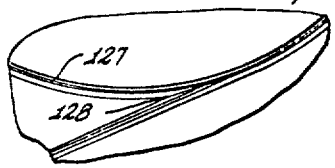
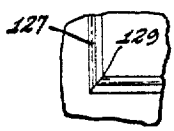
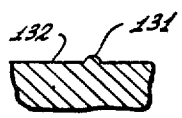

3,890,481

ELECTROEROSIVE PROCESS FOR MANUFACTURING ROTARY DIES

This is a continuation, of application Ser. No. 16,620, filed Oct. 10, 1969, which is a divisional of application Ser. No. 712,247, filed Mar. 11, 1968 and now issued as U.S. Pat. No. 3,542,993 on Nov. 24, 1970.

BACKGROUND OF THE INVENTION

This invention relates to a process and apparatus for the manufacture of rotary dies, for example, cutting, embossing, grooving, knurling, serrating and engraving dies such as are used in the forming, piercing, blanking and shaping of sheet material of all kinds, e.g., metallic and non-metallic sheets in a plastic or rigid state.

Rotary dies inherently have the great advantage of being capable of high speed production of parts. However, the widespread use of such dies has been greatly inhibited because previously known methods of manufacture have made them prohibitively expensive for use in many industries. Another factor tending to defeat the use of rotary dies in some applications has been the inability to form such dies with sharp and clean detail, as for example right angle or sharply acute angle configurations without any radius relief in the included corner. Such configurations have been available in prior rotary dies, if at all, only by extremely time consuming and expensive handwork by engravers. Furthermore, in the past it was common practice to make rotary dies only of a soft steel such as could be handfinished. In the rare cases where the die was made of hardened tool steel, it was then necessary to use much hand grinding to finish the roll.

SUMMARY OF THE INVENTION

This invention greatly reduces the time of manufacture and the cost of rotary dies and provides dies which are superior in sharpness of detail, this superiority being achieved without any hand finishing. In my process an electrode is formed with a flat matrix area that is a flat development of the cylindrical surface of the die roll or workpiece that is to be shaped into a rotary die. This flat matrix area is further formed with areas of discontinuity, i.e., depressions or protrusions in or on the flat surface, that define the die pattern to be imparted to the roll. The electrode is then held in a fixed position while the workpiece is rollingly advanced thereover, for one revolution, in a predetermined spaced relationship of a longitudinal trace of the workpiece and the planar surface of the electrode. Another electrode is electrically connected to the workpiece throughout the cycle whereby the electrical discharge or arc between the matrix electrode and the workpiece removes the metal from the surface of the workpiece to impart the desired die configuration to it.

The apparatus for performing the machining process comprises a means for positively controlling and maintaining the gap between the workpiece and matrix electrode, which may be critical, and for synchronizing the relative movement of the workpiece and the electrode to prevent slippage. To this end, the workpiece is formed with plain bearing surfaces at opposite ends that are biased into positive rolling engagement with a parallel pair of ways and the way surfaces are rigidly maintained in a predetermined spaced relationship to the planar surface of the matrix electrode. A rack and pinion means may conveniently be employed as a means for preventing relative linear movement between the workpiece surface and the surface of the matrix electrode, the pinion being coaxial with the workpiece while the rack extends in parallelism along one of the ways. Appropriate means are also provided to prevent end play in the workpiece as it rolls over the ways. The metal is preferably removed from the surface of the workpiece in a plurality of cycles and, therefore, the apparatus includes feed means for adjusting the discharge gap between the workpiece surface and the electrode between passes.

BRIEF DESCRIPTION OF THE DRAWINGS

FIG. 1 is a partial perspective view of a commercially available form of electrical discharge machine, the work pan front door being partially cut away to show the preferred embodiment of my invention in place on the worktable;

FIG. 2 is a side elevational view of the form of the invention shown in FIG. 1;

FIG. 2a is a partial sectional view taken on the line 2a—2a of FIG. 2;

FIG. 3 is a sectional view on the line 3—3 of FIG. 2;

FIG. 4 is a sectional view, on a larger scale, taken on the line 4—4 of FIG. 3;

FIG. 5 is a schematic view particularly showing the operational relationship of a cylindrical workpiece and matrix electrode during electrical discharge machining;

FIG. 6 is a top plan view of one form of matrix electrode;

FIG. 7 is a perspective view of a finished rotary die formed with the electrode of FIG. 6;

FIG. 8 is a partial elevational view of a portion of the finished die surface of the die of FIG. 7;

FIG. 9 is a top plan of another form of electrode;

FIG. 10 is a partial plan view of the area 10 of FIG. 9;

FIG. 11 is a partial plan view on an enlarged scale of the area 11 of FIG. 9;

FIG. 12 is a top plan view of another form of matrix electrode formed with an embossing configuration;

FIG. 13 is a partial sectional view, on an enlarged scale, of a portion of the electrode of FIG. 12, taken on the line 13—13 of FIG. 12;

FIG. 19 is a partial sectional view of the alternative embodiment.

FIG. 1 shows an electrical discharge machine 10 of a type well known in the art and adaptable for use with my invention. This machine may comprise, for example, an Elox Corporation Model HRP-99. Thus, the machine 10 includes a base 11 housing a coolant reservoir and having a column 12 rising from the base to mount a ram mechanism 13 over a generally box-like work pan 14. A drop-front door 15 of the work pan has been partially cut away to show the preferred embodiment of the invention mounted on the Tee-slots of a work table surface 16 within the work pan 14.

Figure 14:
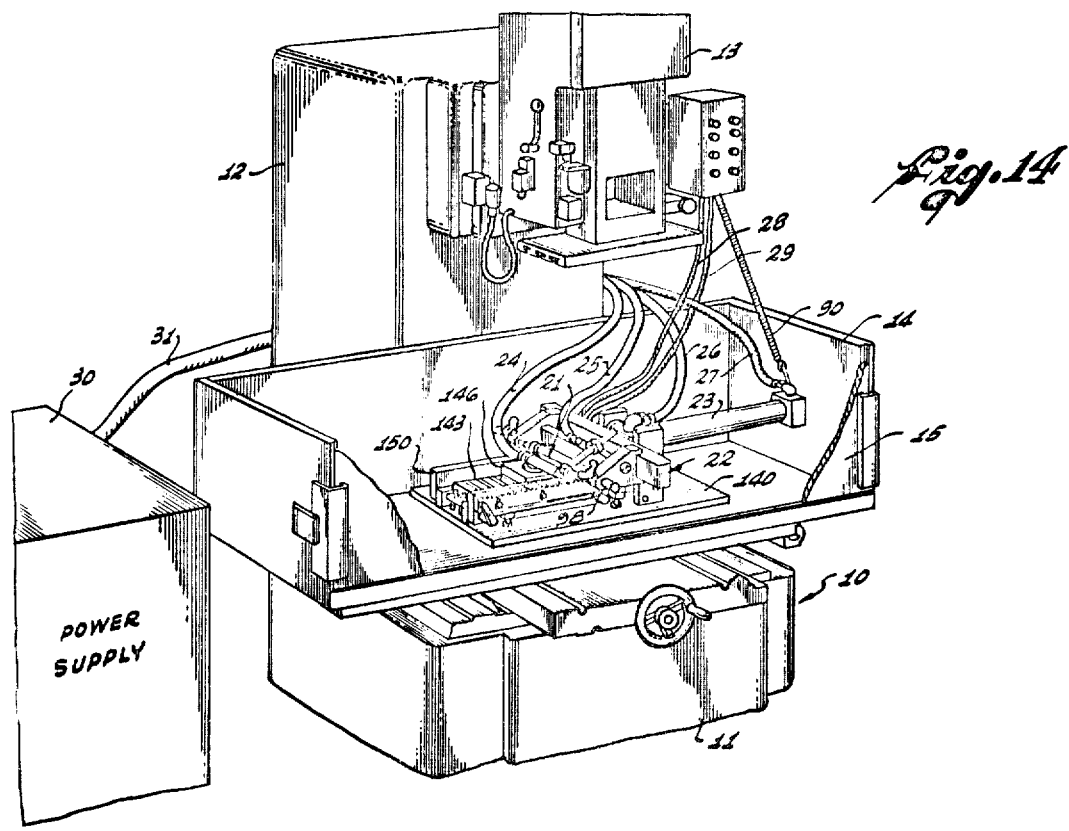
FIG. 14 is a view similar to FIG. 1 but showing another embodiment of my invention on the worktable of the electrical discharge machine.

The apparatus includes a matrix electrode holder and a means for advancing the workpiece over the electrode. Thus, an electrode holder 17 mounts an electrode 18 between a parallel pair of ways 19 and 20 while cylindrical workpiece 21 is carried by a yoke assembly 22 to be rolled along the ways 19 and 20 and over the electrode 18 when the yoke assembly is moved by means of a hydraulic cylinder 23.

The machine 10 incorporates a coolant system, a hydraulic feed system for the ram 13, and an electrical discharge system, and these systems are utilized in the apparatus of the invention. Coolant supply and return lines 24 and 25, respectively, are interconnected at one end to the yoke assembly 22, with their other ends interconnected to the coolant reservoir in the base 11 of the machine 10. A pair of hydraulic fluid lines 26 and 27 are interconnected to opposite ends of the hydraulic cylinder 23 and have their other ends interconnected to the hydraulic means in the machine 10 which would otherwise control the rate of movement of the ram 13. It will be understood that the matrix electrode 18 is electrically insulated from the workpiece 21 and a pair of electrical conductor cables 28 and 29 of the machine 10 are electrically interconnected to the electrode and workpiece, the machine 10 itself deriving its electrical power from a d.c. power supply 30 via cable means 31.

The matrix electrode holding means includes a pair of cross bars 34 and 35 by means of which it can be rigidly affixed to the worktable 16 of the machine 10 by appropriate clamps (not shown) engaged with the Tee-slots of the worktable. The cross bars 34 and 35 are, in turn, rigidly interconnected by a pair of parallel bars 19 and 20. Thus, as is shown for example with reference to the parallel bar 20, in FIG. 2, the bar is rigidly interconnected at its opposite ends by means of appropriate fasteners 36 to the cross bars 34 and 35. The pair of parallel bars 19 and 20 and the cross bars 34 and 35 thus provide a rigid framework on which the matrix holder 17 can be mounted.

The means for holding a matrix electrode in place may take a variety of forms as, for example, mechanical clamps, a magnetic chuck, or a vacuum plate and the latter is preferred. In any event, the matrix electrode is positioned between the parallel bars 19 and 20 and with a predetermined spacing between the plane of the matrix surface of the electrode and the common plane of way surfaces 19a and 20a of the parallel bars 19 and 20, respectively. Additionally, for most types of work it is preferable to accomplish the machining in at least two passes of the workpiece over the electrode and, accordingly, provision is made for adjusting the clearance gap between the matrix surface and the way surface, between passes, to compensate for the depth of metal removed from the workpiece in the prior pass.

More particularly, the matrix electrode holder 17 constitutes a vacuum plate having a three point suspension with respect to the cross bars 34 and 35 and, also, mounted in a manner to effect a vertical feed adjustment of the matrix electrode. Thus, referring to FIG. 3, the electrode holder 17 has a longitudinally extending center section 38 of elongated rectangular plan form disposed between the parallel bars 19 and 20. The upper surface of the center section 38 has been milled out or otherwise formed to define a vacuum chamber 39 of elongated rectangular plan form, extending substantially from one end to the other of the center section 38 and from side to side, the vacuum chamber being permanently covered by a perforated plate 40. At the left-hand end of the holder 17, as viewed in FIG. 3, a passage 41 intercommunicates one end of the chamber 39 with a fitting 42 protruding from one end of the holder 17 and, as is indicated in FIG. 1, a hose 43 is connected to the fitting 42 and has its other end interconnected to a vacuum pump (not shown).

In order to index the electrode 18 on the vacuum chamber cover 40, in parallel relationship to the parallel bars 19 and 20, a plurality of indexing stops are connected to the center section 38 along two sides of the cover 40. These stops may take the form, for example, of a pair of stop members 44 secured by appropriate fasteners 45 along one longitudinal edge of the center section 38 while another stop member 46 is secured on top of the center section 38 by means of a fastener 47 adjacent one end of the cover 40 and substantially at the longitudinal center line of the center section 38. Thus, before the vacuum pump is actuated, the electrode 18 can be indexed on the cover 40 in the proper parallel relationship to the bars 19 and 20.

The illustrated matrix electrode 18 is of sufficient length and width to cover all of the perforations in the cover plate 40. Thus, upon actuation of the vacuum pump, as all of the perforations in the cover 40 are blocked by the electrode 18, the electrode is firmly held in the desired indexed position. However, the upper surface of the electrode is divided into areas 18a and 18b, the former of which comprises the matrix area (i.e., a flat development of the cylindrical area of the workpiece that is to be machined) containing the configuration desired to be imparted to the workpiece. Accordingly, the area 18a is higher than the area 18b, the latter being relieved by being cut away to a sufficient depth so that when the workpiece rolls thereover no electrical discharge machining will occur. Alternatively, the matrix electrode may be made only to a length corresponding to the matrix area 18a (e.g., as in FIG. 19) so that some of the perforations in the cover plate 40 would not be covered by the electrode. In that case, an imperforate sheet material can be cut to size to be lain over that perforated area of the cover 40 which is not blocked by the electrode.

The electrode holder 17 is T-shaped at one end, having a pair of oppositely-extending arms 49 which extend, with clearance, around the corresponding ends of the bars 19 and 20. At its other end, the matrix electrode holder 17 has a single, sidewardly-extending arm 50 that extends, with clearance, around the corresponding ends of the bar 20. At the ends of the arms 49 and 50, each arm is interconnected to the cross bars 34 and 35 by a screwjack means that is adapted for leveling the electrode holder 17 and, also, for accomplishing the vertical feed.

The three supports for the electrode holder 17 are identical in construction and, accordingly, but one of them will be described in detail. Referring to FIG. 4, the cross bar 34 is formed with a counterbored hole 55 that receives the cylindrical body portion of an electrical insulator 56. At its upper end, this insulator is formed with a circumferential flange portion 57 which is seated on the upper surface of the cross bar 34 and at its lower end, the insulator 56 is formed with a hexagonal socket 58 to matingly receive the hex head of the bolt 59, which is thus keyed against rotation. The threaded upper end portion of the bolt 59 is coaxially received within a tubular post 60 that is formed at its lower end with a circumferential flange portion 61 and a plurality of threaded fasteners 62 extend through insulators 54 in the flange 61, through the insulator flange 57, and into the cross bar 34 in order to rigidly mount these parts and the bolt 59 in place. The superposed portion of the holder 17 is formed with a counterbored hole 62 that freely receives the upper end of the tubular post 60. An upwardly facing shoulder 63 at the upper end of the counterbored hole 62 seats a circumferential flange portion 64 of a tubular sleeve 65 that seats an O-ring clamping ring 66, surrounding the hole 62, is held in place on top of the electrode holder 17 by means of a plurality of fasteners 67 to hold the sleeve 65 in place. The body of the sleeve 65 is axially slidably received within a counter bored portion 68 in the upper end of the tubular post 60.

An adjusting shaft 70 is telescopically received within the sleeve 65 and the post 60, the shaft being formed with a downwardly opening elongated tapped bore 71 that is threadedly engaged with the bolt 59. Immediately above the sleeve 65 the shaft 70 is formed with a ball portion 72 that is journalled in a pair of diametrically opposed ball socket members 73 that are seated within the clamping ring 66. Accordingly, upon rotation of the shaft 70 to raise and lower it with respect to the bolt 59, the members 73, clamping ring 66 and holder 17 are raised or lowered since the ball portion 72 of the shaft is held against axial displacement relative to the holder 17. In order to effect desired rotation of the shaft 70, a handle 74 is secured to its upper end, the inner end of the handle being keyed to the shaft and held in place by an appropriate fastener 75. As will now be apparent, when it is desired to level the holder 17 into parallelism with the plane of the ways 19a and 20a, the three screwjack supports can be adjusted by turning of their handles 74.

In order to accomplish vertical feed adjustment of the electrode holder 17, each of the screwjack means is provided with a cap member 78 on whose upper face a pair of stops 79 are mounted to limit turning of the handle 74 within a predetermined arc. As is shown in FIG. 4, the cap member 78 is adapted to enclose the clamping ring 66 and is formed with a central opening 80 through which a stem portion of the adjusting shaft 70 extends. The cap member is normally held in place on top of the holder 17 by means of a set screw 81. As is shown in FIG. 3, the set screw 81 extends through an arcuate angular 82 that is formed in the cap member 78 whereby relative adjustment of the pair of stop pins 79 relative to the axis of the shaft 70 can be accomplished.

The yoke 22 and hydraulic cylinder 23 are mounted between the upright arms 85 of a U-shaped frame whose base portion 86 is clamped to the worktable 16. As is indicated in FIG. 2, a front end cap 87 of the cylinder 23 is provided with a diametrically opposite pair of trunions 88 which are journalled in the uprights 85 for pivotal movement on a horizontal axis. A counterbalancing spring 90 is interconnected between a rear end cap 89 of the cylinder 23 and an appropriate portion of the machine 10, as indicated in FIG. 1. The cylinder 23 includes a piston (not shown) drivingly connected to a piston rod 91 that protrudes through the forward end cap 47 to support the yoke assemble 22.

The yoke assembly 22 includes a horizontally disposed cross bar 93 carried on the protruding end of the piston rod 91 and having at its opposite ends a spaced parallel pair of forwardly protruding yoke arms 94, spaced outwardly from the parallel bars 19 and 20. The thrust axis of the piston rod 91 of the cylinder 23 is midway between the parallel bars 19 and 20 and thus in alignment with the longitudinal center line of the electrode holder 17. In order to assist the yoke 22 in preserving this alignment throughout the stroke of the piston rod 91 and so prevent end play in a workpiece being carried by the yoke assembly 22, a guide means is provided interconnecting the yoke assembly and one of the parallel bars 19 and 20. This may take, for example, the form shown in FIG. 2a wherein a bracket 95 is secured to the yoke adjacent one of the arms 94, the bracket having a spaced pair of downwardly projecting arms 96 that straddle the bar 19, for example. The pair of arms 96 are formed with an aligned pair of tapped bores to threadedly receive a pair of set screws 97 that are preferably made of a low friction and electrically insulating material, for example Teflon, which slidably engage the opposite sides of the bar 19.

The forward ends of the pair of yoke arms 94 mount a coaxially aligned pair of opposed center spindles 98 to rotatably support opposte ends of the workpiece 21, the arms 94 also mounting a pair of set screw devices 99 by means of which the spindles can be locked in place after adjustment. Additionally, the yoke 22 is adapted to carry pressure and return nozzles 100 and 101, respectively, that are interconnected to the coolant supply and return lines 24 and 25, respectively. Thus, a clamp 102 is secured to one of the yoke arms 94 and carries a forwardly-extending rod 103 on whose forward end the supply nozzle 100 is adjustably carried. The nozzle 100 is of elongated configuration to extend longitudinally with respect to the workpiece 21. Similarly, a clamp (not shown) may be mounted on the yoke assembly 22 to mount the return suction member 101 which also has an inlet orifice extending longitudinally along the other side of the workpiece 21. When the machine 10 is operating the drop front door 15 of the work pan 14 is closed and the work pan is filled with coolant to a level which covers the work being machined. During a machining cycle, the coolant is continually supplied through the line 24 to be exhausted from the nozzle 100 adjacent the zone of erosion of metal from the workpiece 22. Then, the coolant with eroded metal is picked up by the suction head 101 at the back side of the workpiece 22 to be carried by the return line 25 back to the coolant reservoir, which also has filtration means for separating the eroded metal from the coolant.

Figures 16, 17, 18:
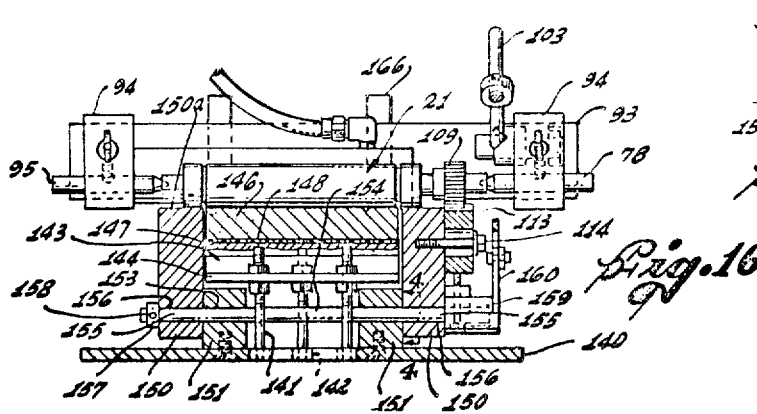
FIG. 16 is a sectional view on the line 16—16 of FIG. 15.
FIG. 17 is a partial, sectional view, on an enlarged scale, taken on the line 17—17 of FIG. 16, showing a cam means for effecting a vertical feed adjustment.
FIG. 18 is a view similar to FIG. 17 but showing the parts in another adjusted position.

The unmachined workpiece 21 is shown in FIG. 16 and is shown in FIG. 7 as it appears after having been machined to a desired die configuration. At opposite ends, the workpiece 21 has a coaxial pair of studs 106 that are center-drilled, as indicated at 107, for mounting on the pair of spindles 98 of the yoke assembly 22. Adjacent one of these studs 106, there is an adaptor section 108 which includes a pinion gear 109. The body of the workpiece 21 is divided into a die area 110 and an opposite end pair of plain bearing rollers 111 by a pair of circumferentially extending grooves 112.

When the workpiece 21 is mounted on the spindles 98 of the yoke assembly 22, the rollers 111 are positioned for rolling engagement with the way surfaces 19a and 20a, onto which they are biased by the action of the spring 90. In order to precisely reproduce on the workpiece 21 the die pattern on the upper surface of the matrix electrode 18, it is essential to prevent slippage of the rollers 111 relative to the way surfaces 19a and 20a. Accordingly, the gear 109 comprises a portion of a rack and pinion means for this purpose. Thus, an elongated bar 113 is secured to the outside surface of the parallel bar 20 by a plurality of headed bolts 114. Each of these bolts extends through a vertically elongated slot 115 formed in the bar 113 and a washer 116 is mounted on the shank of each bolt under the bolt head for clamping the bar 113 to the side of the parallel bar 20. The upper edge of the bar 113 is formed with a rack 117 whose pitch line is adjusted in parallelism with the way surface 20a. This is accomplished by means of a pair of brackets 118 secured to the outside of the way 20, each of the brackets threadedly receiving an adjusting screw 119 that is vertically disposed with its upper end bearing against the lower edge of the bar 113.

The matrix electrodes are of a carbon composition which can be easily worked into the desired die pattern of the flat upper surface of the electrode. Thus, the matrix area 18a of the electrode 18 shown in FIG. 6 is for use in making the specific rotary die configuration of the die area 110 of the workpiece 21 shown in FIG. 7. Referring to FIG. 6, the matrix area 18a is formed with a flat upper surface 120 into which a pair of depressions 121, that are circular in plan form, have been cut. By reference to FIG. 5, it will be seen that the circular depressions 121 have a sharp V-shaped cross-sectional configuration in order to produce the correspondingly shaped sharp-edged circular cutters 122 shown in FIG. 7 and shown in profile in FIG. 8. Thus the upper surface 121 and depressions 120 of the electrode matrix area 18a are a development of the desired cylindrical surface and circular cutters 122 of the rotary die area 110 of FIG. 7.

The operation of the apparatus is shown schematically in FIG. 5. As indicated, one electrode of the electrical discharge machine 10 is electrically coupled to the matrix electrode 18 while the other electrode of the machine 10 is electrically connected to the workpiece 21, as for example, by clamping the electrode to some part of the yoke assembly 22. It will be observed that there is a gap defined between the workpiece 21 and the upper surface 120 of the matrix electrode area 18a by virtue of the difference in levels of the way surfaces 19a and 20a and the upper surface of the electrode.

Thus, when the machine 10 is electrically energized metal will be removed from that longitudinal trace of the workpiece 21 nearest the upper surface 120 of the matrix electrode by an electrical erosion of the metal. Concurrently, the eroded metal is carried away by the coolant exhausting from the nozzle 100 passing through the gap and being picked up by the suction member 101. Actuation of the hydraulic cylinder 23 effects horizontal feeding of the workpiece 21 which thus rolls, without slippage, along the way surfaces 19a and 20a, making substantially one revolution as it moves from one end of the matrix area 18a to the other end of the matrix area. During the course of this revolution, metal is electrically eroded from the surface of the workpiece in the die area 110 in a surface pattern complementary to the surface pattern of the matrix area 18a since those portions of the workpiece coming into registration with the areas included by the circular depressions 121 will have less metal removed than those portions passing over the surface 120 in registration with the flat area of the surface 120.

For speed of production and for accuracy of reproduction of the matrix pattern, it is desirable to remove the metal in at least two passes. As shown in FIG. 8, after a first pass, there will be left a portion of metal 123, included between the dotted outline and the solid outline of the desired pattern, which has yet to be removed in order to accomplish the final outline with a desired sharpness of detail. Accordingly, in order to reset the apparatus for the proper optimum gap between the remaining metal and the surface 120 of the matrix electrode area 18a, the electrode holder 17 is raised by turning all of the adjusting screw handles 74 through the same arc, after the first pass and the workpiece 21 is returned back to the starting position by the hydraulic cylinder 23. Then, the vertical feed adjustment having been accomplished, the machine 10 is re-energized electrically for another machining cycle in a second pass to remove the portion of metal 123. As a result of the second pass, the pattern of the upper surface 120 of the matrix electrode is precisely reproduced, with a desired quality of surface finish, in the die area 110 of the workpiece. 21.

FIG. 9 illustrates an electrode 125, in plan view, having an upper surface 126 which has been worked to create a pattern such as would be appropriate for the manufacture of an engraving die, for example, a trademark label. As before, the desired pattern, represented by the complex groove 127, is reproduced by forming depressions in the upper surface 126. As is shown in FIG. 10, this pattern includes a sharply acute angle 128, defined between tangent and curved portions of the groove 127, which it is desired to reproduce cleanly and in sharp detail. Similarly, FIG. 11 shows a right angle corner 129. With prior methodsthis kind of detail could be reproduced only be extremely expensive handwork, whether on hardened or soft dies, but with my apparatus rotary dies, for whatever purpose, can be reproduced from either soft or hardened steel with faithful and sharply defined reproduction of details such as illustrated in FIGS. 11 and 12.

FIG. 12 depicts a matrix electrode 130 adapted for the machining of an embossing die. In this case, as indicated in FIG. 13, the surface detail takes the form of protrusions 131 above a generally flat surface 132 of the electrode, the protrusions thus being adapted to produce correspondingly patterned depressions in those surfaces of the workpiece which come into registration therewith. Thus, as is indicated by the variety of patterns of the electrodes of FIGS. 6, 9 and 12, the invention provides a relatively simple means of reproducing patterns of all degrees of complexity and with sharpness of detail in rotary dies.

An alternative species of the invention is shown in FIGS. 16–19. This apparatus includes a base plate 140 that is adapted to be rigidly mounted on the ways of the work table of the electrical discharge machine 10. Three stud bolts 141 have their lower ends secured in electrical insulators 142 set in the base plate 140 so as to protrude vertically upwardly therefrom and are adapted at their upper ends to support ends of a magnetic chuck 143. It will be noted that two of the stud bolts 141 are located adjacent one end of the chuck 143 on opposite sides of the longitudinal axis of the chuck while the other stud bolt is located at the opposite end of the chuck and positioned to intercept the longitudinal axis of the chuck. At both of its ends, the chuck 143 is provided with end flanges 144, each of which is formed with a bore or bores through which the upper ends of the stud bolts 141 pass with clearance. Each of the stud bolts 141 mounts a pair of lock nuts 145 on opposite sides of the flange 144. Thus, the lock nuts 145 of each stud bolt 141 can be individually adjusted whereby to accomplish leveling of the magnetic chuck 143 and of the electrode to be supported thereon. In the illustrated case, as is shown in FIG. 16, an electrode 146 is bonded to a bottom plate 147 by a layer of an epoxy adhesive 148 so that when the chuck 143 is energized the electrode 146 will be rigidly held in place.

In order to mount a pair of ways 150, the base plate has a pair of elongated bars 151 mounted, in parallelism, to the upper surface of the base plate 140 by means of a plurality of suitable screw fasteners 152. At both ends, the pair of parallel bars 151 are formed with coaxially aligned bores 153 which provide plain bearings to rotatably support opposite end portions of a shaft 154, there being another shaft 154 similarly mounted at the other ends of the bars. As is best seen in FIG. 16, each of the shafts 154 is formed with eccentric opposite end portions 155 that are rotatably seated within corresponding bores 156 that are formed in each of the opposite ends of each of the ways 150. The pair of ways 150 are slidably clamped against the outer sides of the parallel bars 151, for vertical adjustment, by means of a collar 157 secured to one end of each shaft by means of a set screw 158, or the like, the other end of the shaft mounting a socket portion 159 of a lever 160, the socket being keyed or otherwise drivingly connected to the shaft. The parallel ways 150 are thus slidably clamped against the outer sides of the parallel bars 151, for vertical adjustment which is effected by the camming action of the shaft portions 155.

Figure 15:
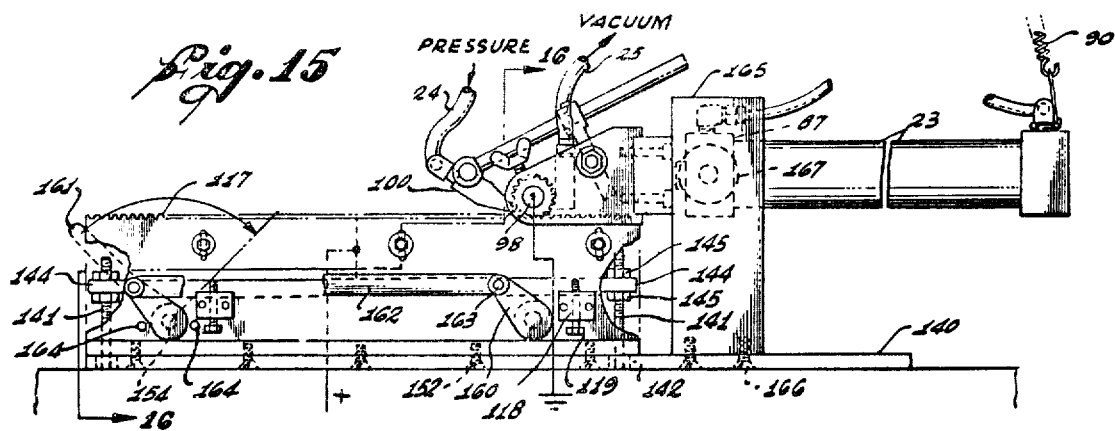
FIG. 15 is a side elevational view of the alternative embodiment of the invention.

Referring to FIG. 15, it will be seen that one of the levers 160 is formed with a handle extension 161 and that a link 162 is pivotally interconnected at its opposite ends, by means 163, to the levers 160 at axes that are equally spaced from the axes of the pair of shaft 154. With this arrangement, both of the shafts 154 are actuated simultaneously by manual movement of the handle 161, in the manner schematically shown in FIGS. 17 and 18. By this means, the spacing between the upper surfaces 150a of the pair of ways 150 and the upper face of the electrode 146 can be adjusted to provide a vertical feed. Thus, on a first pass of a workpiece 21 over the electrode 146 the shaft portions 154 and 155 occupy the relative positions illustrated in FIG. 18. As a result, the workpiece 21 is machined to a predetermined depth on the first pass, with a resultant increase in the gap between the workpiece and the uppersurface of the electrode 146. Accordingly, for a second pass, as for finish machining, this gap must be reduced by a predetermined distance X indicated in FIG. 18. This is accomplished by turning of the lever 161 to the position indicated in FIG. 17, the cam action then resulting in lowering of the ways the desired distance X, to once again reduce the gap between the workpiece and electrode to the optimum size for electrical machining on the second pass. As is shown in FIG. 15, a pair of stop pegs 164 are provided on one of the ways 150 to limit movement of the handle 161 at positions corresponding to the cam positions indicated in FIGS. 17 and 18.

The remaining parts of the alternative species of the invention are essentially the same in construction and mode of operation as in the preferred embodiment and, accordingly, will not be described in detail. It will be seen that the same yoke assembly 22 and hydraulic cylinder 23 are employed, as well as the rack and pinion means for preventing slippage of the workpiece 21 as it rolls over the way surfaces 150a. Briefly, the yoke assembly 22 and hydraulic cylinder 23 are supported at the upper ends of a pair of upright posts 165 which have their lower ends secured to the base plate 140 by means of a plurality of fasteners 166. As is shown in FIG. 16, these posts are equally spaced on opposite sides of a vertical plane longitudinally bisecting the electrode 146. In order to pivotally mount the front end of the cylinder 23 between the posts 166, for movement about a horizontal axis, the front end cap 87 of the cylinder is pivotally connected to the confronting surfaces of the posts by a pair of large diameter plain bearing means 167. The counterbalancing spring 90 connected to the other end cap 89 of the hydraulic cylinder 23 thus acts to bias the workpiece 21 carried in the spindles 98 of the yoke assembly 22 into firm rolling engagement with the way surfaces 150a. As before, the elongated rack bar 113 is secured to the outside surface of one of the ways 150 by suitable fasteners 114, the rack bar being adjustable by means of the fasteners 119 set in the brackets 118 and bearing again: t the underside of the rack bar.

In the illustrated case, the matrix electrode 146 is formed on its upper surface with the same pattern of a pair of circular grooves 121 as in the case of the matrix electrode area 18a shown in FIG. 6, for the electrode 18. However, unlike the electrode 18, the matrix electrode 146 has an overall length which is the same as the circumference of the unmachined workpiece 21.

As will now be apparent, the mode of operation of the alternative species of the invention is substantially the same as in the preferred embodiment except that in the former, a magnetic chuck 143 is employed in lieu of the vacuum chuck of the first embodiment and the vertical feed adjustment is accomplished by raising and lowering of the way surfaces rather than by raising and lowering of the chuck.

While the invention has herein been shown and described in a preferred and an alternate embodiment, it will be recognized that departures may be made therefrom within the scope of the invention, which is not to be limited to the details disclosed herein but is to be accorded the full scope of the claims so as to embrace equivalent devices.

I claim:

1. A method of manufacturing a rotary die from a roll that includes:

forming an electrical discharge electrode with a matrix surface that is a flat development of at least part of the shape characteristics desired to be imparted to a part, at least, of the endless surface of the roll, mounting the electrode between a spaced pair of coplanar way surfaces in rigidly fixed spaced parallel relationship of the matrix surface to the way surfaces, and engaging opposite ends of the roll and the way surfaces during relative movement therebetween to effect rotation of the roll to sequentially effect guided uniformly spaced registration of longitudinal traces of the surface of the roll with the matrix surface of the electrode.

2. A method as in claim 1 in which:
said surface of said electrode is made of an area that is substantially equal to the cylindrical area of the roll that is to be machined to make the die.

3. A method as in claim 1 in which:
said flat matrix surface of said electrode is further shaped to form discontinuities in said flat matrix surface in a predetermined pattern that is complementary to a desired pattern of discontinuities of the cylindrical surface of the die.

4. A method as in claim 1 that includes:
rollingly supported opposite end portions of the roll on a parallel pair of said way surfaces for effecting said rotation of the roll upon relative movement of the roll and said way surfaces.

5. A method as in claim 1 that includes:
forming the roll with an opposite end pair of the roller bearing surfaces adjacent opposite ends of the surface of the roll to be machined;
making said flat matrix surface of said electrode substantially rectangular in planform and of an area substantially equal to the area of that surface of the roll to be machined;
forming discontinuities in said flat matrix surface of said electrode in a predetermined pattern;
rigidly positioning said electrode between a parallel pair of said way surfaces with said flat matrix surface of said electrode parallel to the common plane of said way surfaces;
and rolling said roller bearing surfaces of the roll along said way surfaces.

6. An electroerosive method of making a rotary die from a roll that includes:
forming a surface area of an electrical discharge electrode as a flat development of a part, at least, of the surface area of the roll;
forming the flat developed surface area of the electrode into a matrix for the shape characteristics desired to be electroerosively formed in the surface area of the roll;
mounting the electrode between a spaced pair of coplanar way surfaces, with the matrix area exposed between the way surfaces; and
rolling the opposite ends of the roll on the way surfaces to effect sequential registration of longitudinal traces of that portion of the surface area of the roll to be formed into a die with the matrix area of the electrode is held in rigidly fixed relationship to the way surfaces with the matrix area disposed in a plane parallel to the plane swept by the longitudinal traces of the roll.

7. A method as in claim 6 in which: the flat developed area of the electrode is made of a length substantially equal to the circumference of the roll, which length of flat developed area is traversed during substantially one complete revolution of the roll on the way surfaces.

8. A process as in claim 6 in which:
the flat developed area of the electrode is formed into a matrix that includes discontinuities in the flat area that are oriented in directions of which some, at least, are oriented in directions other than normal to the axis of revolution of the roll on the way surfaces.

9. A process as in claim 6 in which:
the roll is formed with opposite end roller bearing surfaces of substantially the same diameter as the diameter of that intermediate length of the roll that is to be formed into the rotary die area.

10. A process as in claim 6 in which:
the electrode is rigidly held with the matrix area in spaced parallel relationship to the common plane of the way surfaces.

* * * * *

UNITED STATES PATENT OFFICE
CERTIFICATE OF CORRECTION

Patent No. 3,890,481    Dated June 17, 1975

Inventor(s) Homer G. Buck

It is certified that error appears in the above-identified patent and that said Letters Patent are hereby corrected as shown below:

Column 5, line 51, "angular" should be -- slot --;

line 52, "relative" should be -- angular;

line 53, "accemplished" should be -- accomplished --.

Signed and Sealed this twenty-eight Day of October 1975

[SEAL]

Attest:

RUTH C. MASON
Attesting Officer

C. MARSHALL DANN
Commissioner of Patents and Trademarks